United States Patent [19]

Laing

[11] 3,977,816
[45] Aug. 31, 1976

[54] MECHANICALLY DRIVEN COMPRESSOR FOR AIR CONDITIONING DEVICES, PARTICULARLY IN VEHICLES

[76] Inventor: Nikolaus Laing, Hofener Weg 35 bis 37, 7141 Aldingen near Stuttgart, Germany

[22] Filed: June 14, 1974

[21] Appl. No.: 479,435

Related U.S. Application Data

[63] Continuation of Ser. No. 297,872, Oct. 16, 1972, abandoned.

[30] Foreign Application Priority Data

Oct. 20, 1971  Austria .............................. 9055/71

[52] U.S. Cl. ............................... 417/355; 417/420; 417/902; 418/99
[51] Int. Cl.² .................... F04B 17/00; F04B 35/04; F01C 21/04; F04C 29/02
[58] Field of Search ................... 417/355, 356, 420; 418/98, 99

[56] References Cited
UNITED STATES PATENTS

| 1,964,415 | 6/1934 | Van Deventes .................... 417/356 |
| 3,520,642 | 7/1970 | Fulton ............................... 417/420 |

FOREIGN PATENTS OR APPLICATIONS

| 496,759 | 10/1953 | Canada ............................. 417/420 |

*Primary Examiner*—Carlton R. Croyle
*Assistant Examiner*—Richard E. Gluck
*Attorney, Agent, or Firm*—Pennie & Edmonds

[57] ABSTRACT

A mechanically-driven hermetically sealed compressor for air-conditioning devices where the compressor is driven by a magnetic torque transmission arrangement which has a pole ring disposed outside the hermetically sealed compressor housing and one inside the housing. The compressor housing is, in the region of a gap between the pole rings, constructed in the form of a sealing separating wall of magnetically pervious material.

1 Claim, 4 Drawing Figures

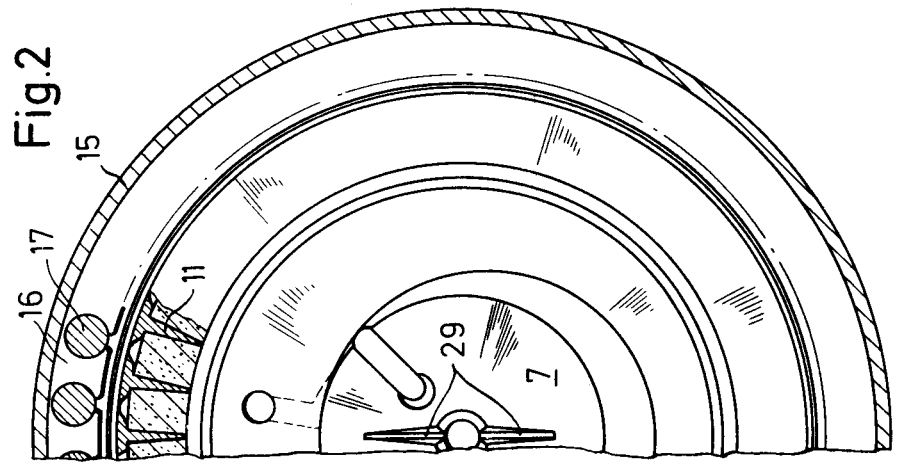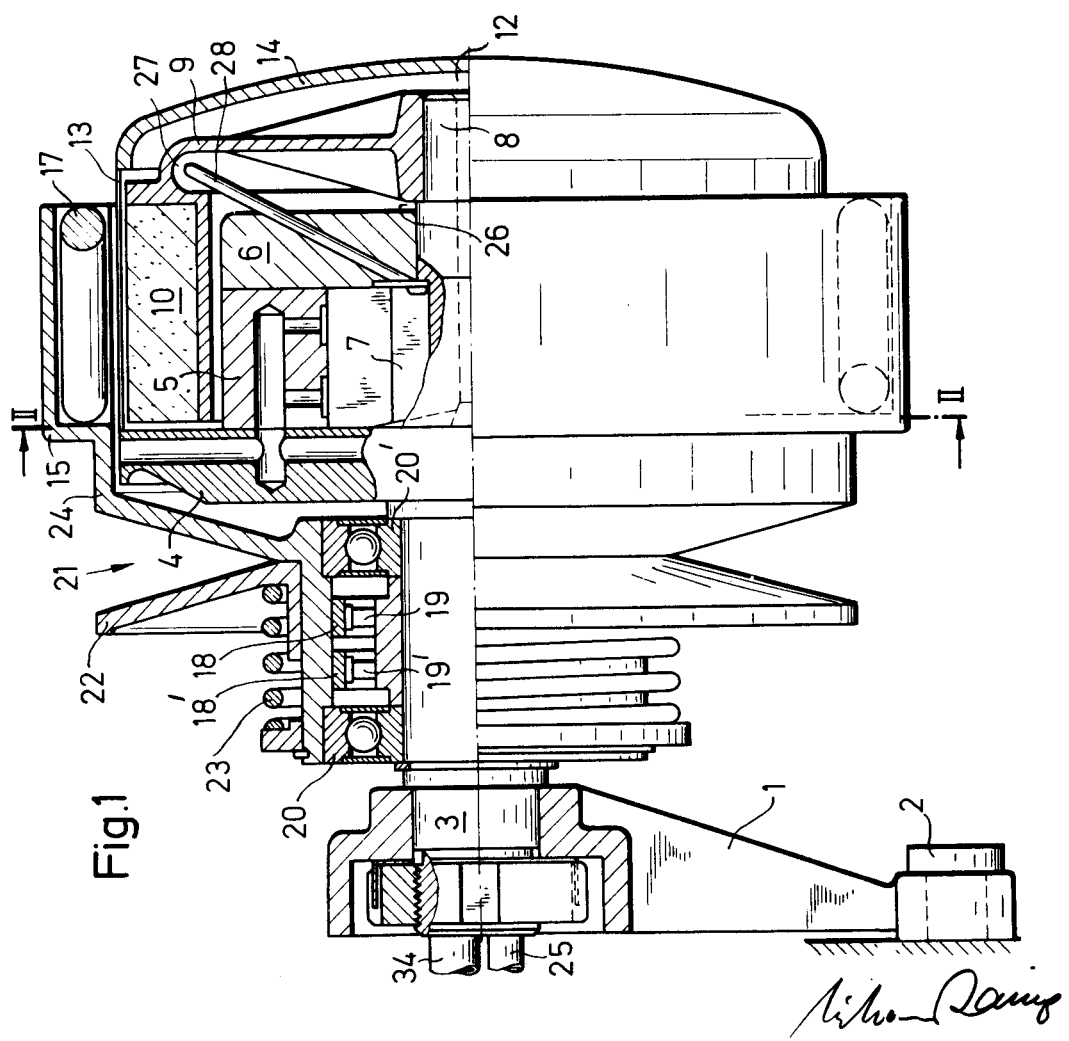

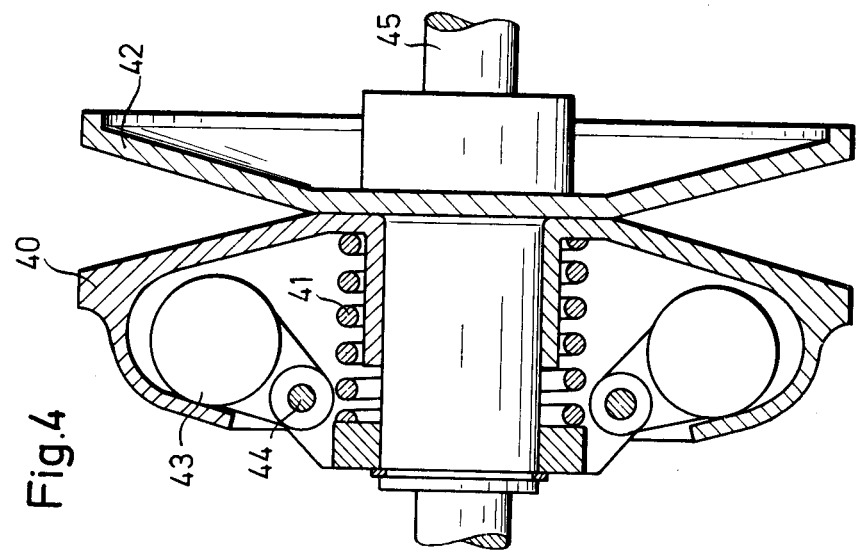
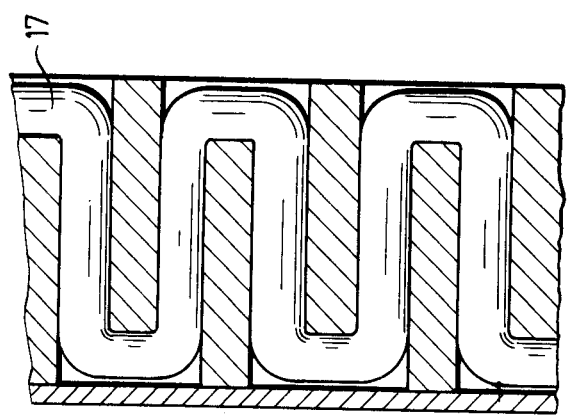

MECHANICALLY DRIVEN COMPRESSOR FOR AIR CONDITIONING DEVICES, PARTICULARLY IN VEHICLES

This is a continuation, of application ser. no. 297,872 filed Oct. 16, 1972, now abandoned.

THE PRIOR ART

In air-conditioning installations for motor vehicles compressors are exclusively used which have shaft sealing means. Since refrigerants are, though only to a small extent, soluble in oil, a leakage flow of refrigerant is always lost through the shaft seal, even where continuous lubrication of the seal is ensured. Moreover shaft seals are not suitable for high speeds of rotation, whilst, on the other hand, the displacement efficiency of rotary compressors improves with speed of rotation.

A cooling device for air-conditioning installations in motor vehicles is known in which a first electrically excited pole ring drives a second pole ring, which is provided with a winding. In this known arrangement it is desired to keep the speed of rotation of the compressor constant, by varying the slip of the electro-magnetic clutch by in turn varying the magnetude of the excitation. This control principle did not become popular in the context of motor vehicle designs, since the maintenance of a certain speed of the compressor rotor via a magnetic slipping clutch involves a considerable loss of power when operated under slip conditions, which is lost from the vehicle drive and has to be disposed of in the form of heat, which results in technical difficulties. In the case of this known cooling means, the compressor rotor is driven via a shaft which is sealed with respect to the stationary portion of the compressor by a shaft seal. This shaft seal brings with it leakage of refrigerant and a not inconsiderable maintenance requirement for the aggregate.

THE OBJECT OF THE INVENTION

The invention has the purpose of providing a construction of the compressor in which both parts can be hermetically sealed with respect to each other, and in which mechanical transmission elements are eliminated.

DESCRIPTION OF THE INVENTION

With a view to solving this problem, the invention provides a mechanically-driven compressor for air-conditioning devices, particularly for air-conditioning of vehicle cabins, in which the compressor rotor is driven via a magnetic clutch having two rotating pole rings facing each other. The poles of one pole ring are excited by windings supplied with DC. One pole ring is secured to the driving system while the other pole ring is secured to the pressure producing system. A separating wall of magnetically pervious material which hermetically seals the two systems with respect to each other extends through a gap between the pole rings and forms part of a housing which sealingly encloses the compressor.

In this way any leakage loss of refrigerant from the pressure producing system via shaft seals, as in the case of arrangements in accordance with the state of the art, is eliminated. The compressor may be connected to stationary heat exchangers via conduits arranged in the proximity of the axis. The heat exchangers of the compressor may however also be in the form of rotary heat exchangers, which are rigidly connected to the driven part of the compressor and which rotate with the latter.

The second pole ring which is associated with the pole ring having the windings may be made up of permanent magnets, although it may also be constructed in the form of a soft magnetic pole ring with a cage winding, of the kind employed in the rotors of induction motors. In this case the device embodying the invention not only enables the equipment to be shut down when desired, but the device can be switched on whilst the pole ring which is secured to the driving device rotates.

The electro-magnetic pole ring is advantageously wound on the principle of the wave winding or/of claw pole construction, so that only one coil is required. Preferably the drive is arranged via a V-belt variable transmission, which is controlled by the speed of the motor. Hysteresis magnets or pole rings with cage windings are also suitable. In both cases constant speed operation can then be dispensed with.

The invention will now be described, by way of example, with reference to the drawings.

FIG. 1 shows a compressor embodying the invention in section and partly in elevation.

FIG. 2 shows a section on the line II—II in FIG. 1.

FIG. 3 shows a portion of the wave winding of the pole ring.

FIG. 4 shows the drive disc of the compressor in FIG. 1, in section.

The device shown in FIG. 1 has a pivot arm 1, which is pivotable about a bolt 2 secured to a motor vehicle engine. A hollow axle 3 and a housing 5 are rigidly secured to the pivot arm 1. A rotor 7 of a compressor is driven via a shaft 8 and a wheel disc 9 by a first pole ring 10 which has permanent magnets. This pole ring has a substantial number of poles 11 of alternate polarity distributed over its perimeter. The compressor is located in a hermetically sealed chamber 12, which is formed by the separating wall 13 constructed in the form of a split tube and the end wall 14 together with the compressor wall 4. An electro-magnetic second pole ring 15 having the same number of soft iron poles 16 as the magnetic poles 11 of the pole ring 10 rotates relative to the compressor housing 5. A coil 17 of wave configuration as shown in FIG. 2 forms the pole 16. The two ends of the coil are connected to the slip rings 18, 18'. The latter are connected via the brushes 19, 19' to the DC supply via a switch (not shown).

The pole ring 15, which is supported in ball bearings 20, 20' forms a unit with a driven V-belt split pulley 21. The latter has an axially displaceable wall or cheek 22 which is pressed against the second wall or cheek 24 by a spring 23.

In operation of the compressor, refrigerant is sucked through the conduit 34 and discharged via the conduit 25 in compressed form. Lubricating oil within the chamber squirts out of the bearing gap 26 and collects in the rotating annular chamber 27.

A pipe 28 in the form of a wing-shaped interceptor extends into the chamber 27 and directs the oil under pressure to the lubricating grooves 29 of the compressor rotor 7. Together the pipe 28 and grooves 29 form a lubricating means for the compressor rotor.

A second driving V-belt split pulley, as shown in FIG. 4, is secured to a rotary power take-off from the motor vehicle engine. The axially movable wall or cheek 40 is pressed against the stationary wall or cheek 42 by a spring 41 whilst the fly weights 43, which are pivotable about the axes 44, cause the axially movable wall 40 to become spaced from the wall 42 by a distance which increases with the speed of the shaft 45. By this means the curvature of the V-belt and hence the transmission ratio is variable.

I claim:

1. A magnetically driven compressor for an air-conditioning device comprising an axially extending compressor rotor for pumping a refrigerant, a fixed axially extending compressor housing circumferentially surrounding said compressor rotor, an axially extending first pole ring exterior of said compressor housing connected at one axial end to and circumferentially surrounding said compressor rotor, an axially extending second pole ring circumferentially surrounding said first pole ring and spaced therefrom by a gap, DC windings on said second pole ring adapted to be connected to a source of DC current, an axially extending magnetically pervious wall in said gap circumferentially surrounding said first pole ring, wall means including said magnetically pervious wall forming a chamber hermetically sealing therein said first pole ring, lubricating means within said chamber for circulating a lubricating fluid to lubricate said rotor, and mechanical drive means for rotating said second pole ring; said compressor rotor, compressor housing, first and second pole rings being substantially the same axial length, being positioned co-axially with respect to each other, and being spaced radially with respect to each other whereby when said DC windings are connected to a source of DC current, a magnetic couple is provided between said first pole ring and said second pole ring to rotate said compressor rotor when said second pole ring is rotated by said mechanical drive means.

* * * * *